(12) United States Patent
Orzelski

(10) Patent No.: US 8,398,167 B2
(45) Date of Patent: Mar. 19, 2013

(54) REACTIVE HEAD RESTRAINT HAVING ATTACHMENT POINTS FORWARD OF SEAT BACK FRAME

(75) Inventor: Zbigniew J. Orzelski, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/849,902

(22) Filed: Aug. 4, 2010

(65) Prior Publication Data

US 2012/0032480 A1 Feb. 9, 2012

(51) Int. Cl.
*B60N 2/427* (2006.01)
(52) U.S. Cl. .................................. 297/216.12
(58) Field of Classification Search ............. 297/216.12, 297/216.13, 216.14; 16/374, 86 A, 86 R
See application file for complete search history.

(56) References Cited

U.S. PATENT DOCUMENTS

| | | | |
|---|---|---|---|
| 4,944,554 A | 7/1990 | Gross et al. | |
| 6,749,256 B1 * | 6/2004 | Klier et al. | 297/216.12 |
| 6,935,672 B2 | 8/2005 | Dehart | |
| 7,096,562 B1 | 8/2006 | Dehart | |
| 7,111,888 B1 | 9/2006 | Dehart | |
| 7,344,190 B2 | 3/2008 | Haglund et al. | |
| 7,374,239 B1 * | 5/2008 | Jayasuriya et al. | 297/216.12 |
| 7,560,060 B1 | 7/2009 | Dehart | |
| 7,597,391 B2 * | 10/2009 | Jayasuriya et al. | 297/216.12 |
| 7,959,224 B2 * | 6/2011 | Orzelski et al. | 297/216.12 |
| 2009/0102255 A1 * | 4/2009 | D'Agostini et al. | 297/216.12 |
| 2009/0179468 A1 * | 7/2009 | Orzelski et al. | 297/216.12 |

* cited by examiner

*Primary Examiner* — Milton Nelson, Jr.
(74) *Attorney, Agent, or Firm* — Shook Hardy & Bacon LLP

(57) ABSTRACT

A reactive head restraint system for an occupant of an automotive vehicle seat includes a seat back frame and a reactive head restraint mechanism attached to the seat back frame. A head restraint is attached to the reactive head restraint mechanism. The seat back frame includes a left side member, a right side member, and an upper cross member. The cross member connects the left and right side members of the frame. The reactive head restraint mechanism includes a hinge for attachment to the upper cross member, a pair of spaced apart steel tubes attached to the front leaf of a hinge, a pair of plastic guide sleeves, and a push plate. The guide sleeves are inserted into the upper ends of the steel tubes. The posts of the head restraint are inserted into the guide sleeves. The rear leaf of the hinge is attached to either the underside of the cross member or is attached to the front of the cross member. The push plate is attached to the lower ends of the spaced apart steel tubes. Because of the hinged attachment of the steel tubes to the cross member, the push plate moves toward the rear of the vehicle and the head restraint simultaneously moves toward a front of the vehicle in response to occupant movement toward the rear of the seat back during vehicle impact.

5 Claims, 7 Drawing Sheets

REACTIVE HEAD RESTRAINT HAVING ATTACHMENT POINTS FORWARD OF SEAT BACK FRAME

TECHNICAL FIELD

The disclosed invention relates to reactive head restraints for vehicle seats. More particularly, the disclosed invention relates to a reactive head restraint mechanism attached to the upper cross member of a seat back frame.

BACKGROUND OF THE INVENTION

An automotive vehicle typically includes a head restraint for each of the front seats. These head restraints generally extend vertically from the seat back and may prevent neck hyperextension during rear collision as a head restraint of an automotive seat limits rearward movement of a head of an occupant. During a rear impact event, the occupant's torso is pressed into the seat due to differences in velocity between the seat and the occupant and the head of the occupant contacts the head restraint after some delay.

Many systems have been proposed for moving the head restraint forward toward the seat occupant's head in reaction to a forward acceleration of the vehicle during rear impact. Such mechanical systems that do not contain any electrical components connected to a crash sensor are referred to herein as "reactive head restraint systems." Head restraint systems connected to a crash sensor are referred to as "active head restraint systems." Active head restraint systems are typically more expensive than reactive systems, require resetting by a skilled automotive technician and cause discomfort to the occupant until they are reset.

Efforts have been made to provide reactive head restraints in existing seat designs equipped with passive two-way or four-way head restraint system. However, in such situations the implementation has required the provision of a new upper cross-member, which in turn requires an expensive and time-consuming revision of the seat back frame. This difficulty arises when efforts are made to package the guide sleeves of the head restraint tubes at a location within the upper cross-member of the seat back frame. To make such a change the holes in the upper cross member would have to be elongated, which in turn would require tooling revisions at the assembly line and the upper cross member for the reactive head restraint would have to be different from the one used with a passive head restraint system. The manufacturing production of multiple types of seat back frames is more expensive than for a common frame.

SUMMARY OF THE INVENTION

The disclosed invention provides an alternative arrangement to known vehicle seat head restraint safety systems. The disclosed invention is a reactive head restraint mechanism that attaches to a seat back frame. Typically the seat back frame equipped with a reactive head restraint system includes a left side member, a right side member, and an upper cross member. The cross member connects the left and right side members of the frame. A head restraint is attached to the reactive head restraint mechanism.

The reactive head restraint mechanism according to the disclosed invention includes a hinge for attachment to the upper cross member, a pair of spaced apart steel tubes attached to the hinge, a pair of plastic guide sleeves, and a push plate. The guide sleeves are inserted into the upper ends of the steel tubes. The posts of the head restraint are inserted into the guide sleeves.

The spaced apart steel tubes can be attached to the front leaf of the hinge by welding. The rear leaf of the hinge is attached to the upper cross member. The rear leaf can be attached to the underside of part of the cross member or can be attached to the front side of the cross member. Attachment of the hinge to the cross member may be made by nut-and-bolt fastening such as by a pair of weld studs. In one embodiment the weld stud for attaching the hinge to the front of the cross member may be rearward facing thereby allowing convenient attachment with threaded nuts using a power gun or other fastening tool. Attachment of the hinge to the cross member may also be made by welding (for example, by spot welding or MIG welding).

The push plate is attached to the lower ends of the spaced apart steel tubes. Because of the hinged attachment of the steel tubes to the cross member, the push plate moves toward the rear of the vehicle and the head restraint simultaneously moves toward the front of the vehicle in response to occupant movement toward the rear of the seat back during vehicle impact.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
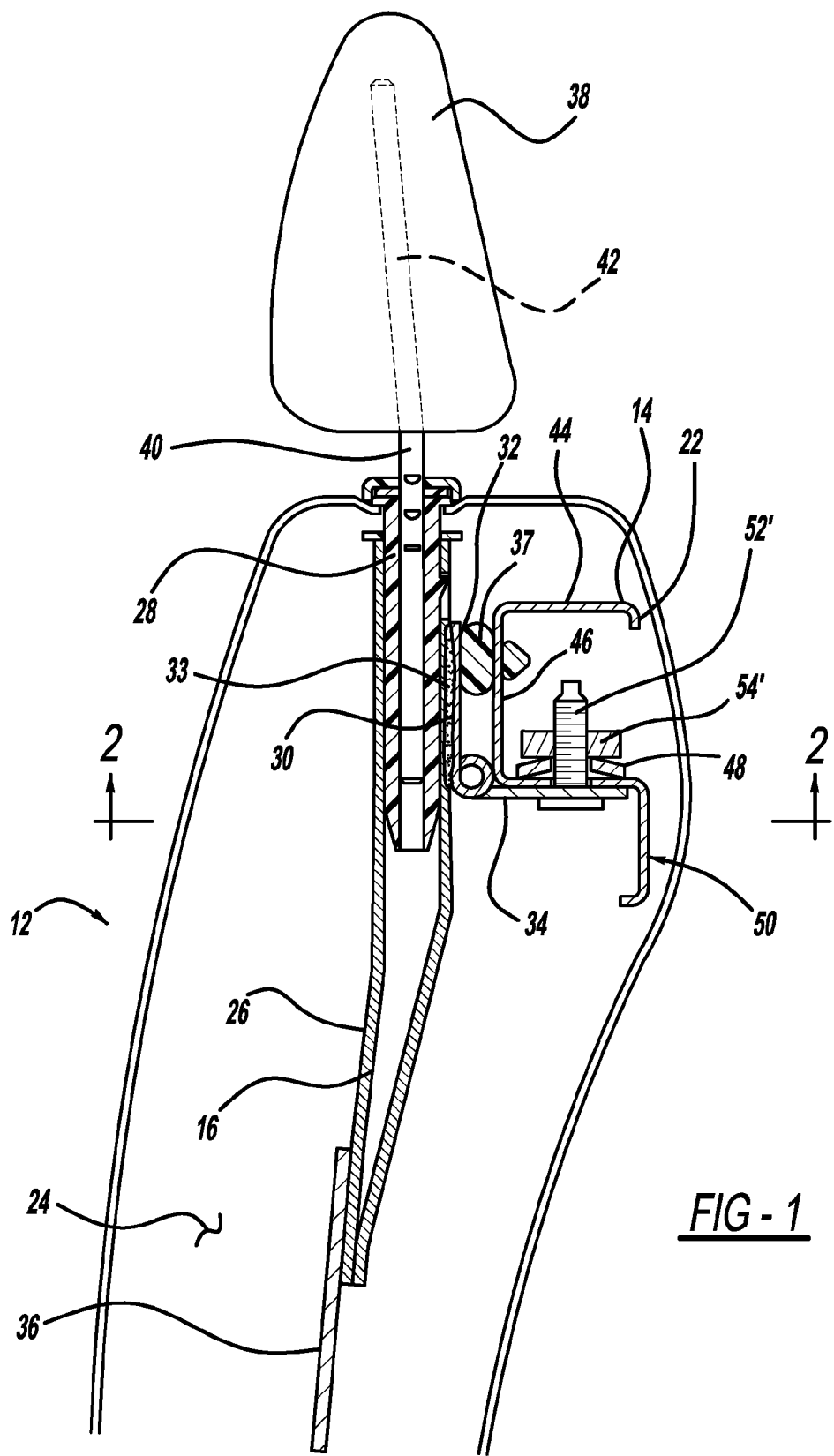
FIG. 1 is a side view with a cross-section of the reactive head restraint mechanism and the upper cross member of the automotive seat back frame in accordance with a first embodiment of the disclosed invention illustrating the reactive head restraint system in its normal position.
Figure 2:
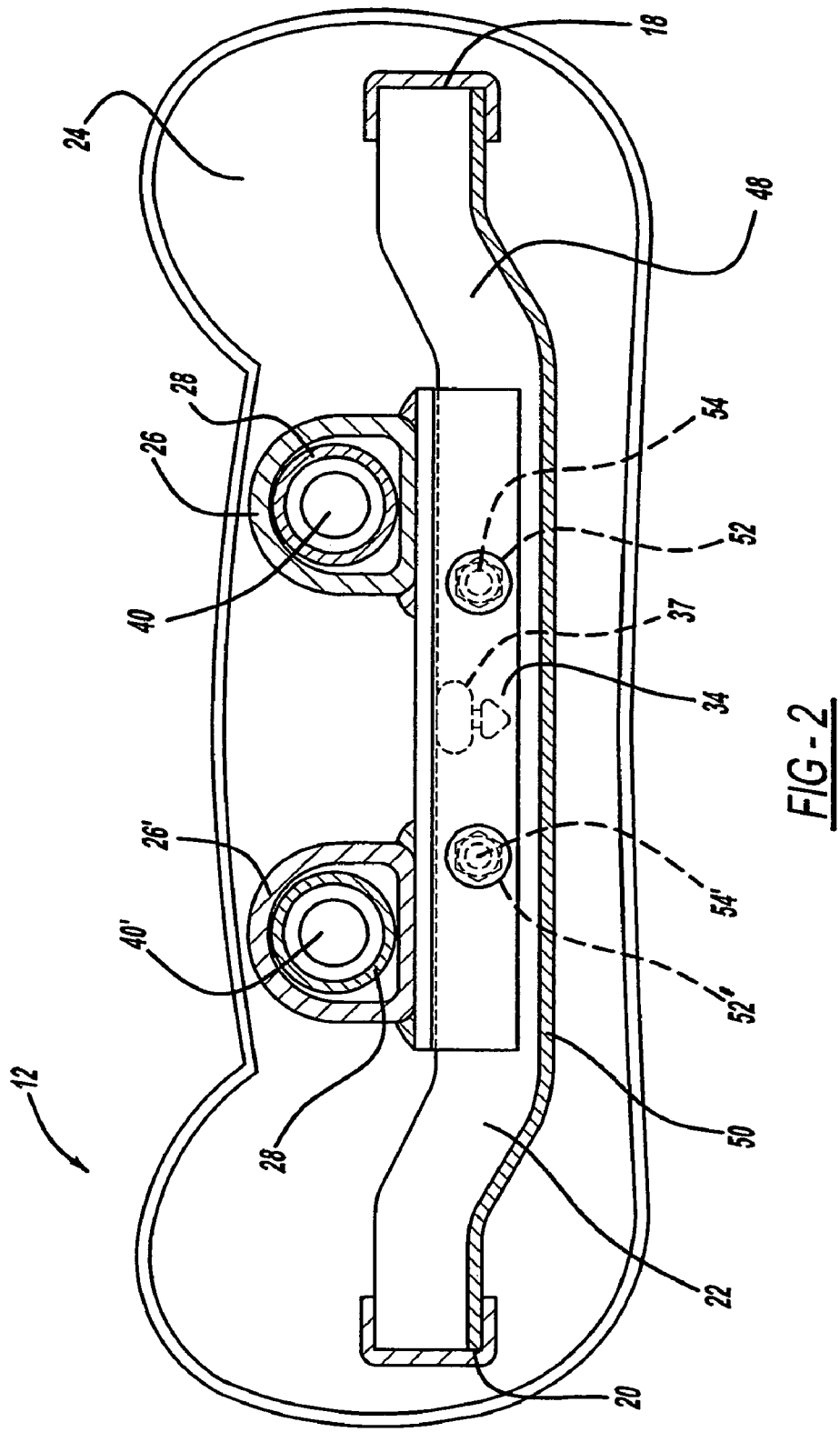
FIG. 2 is a cross-sectional view of the first embodiment of the reactive head restraint system and upper cross member taken along line 2-2 of FIG. 1.
Figure 3:
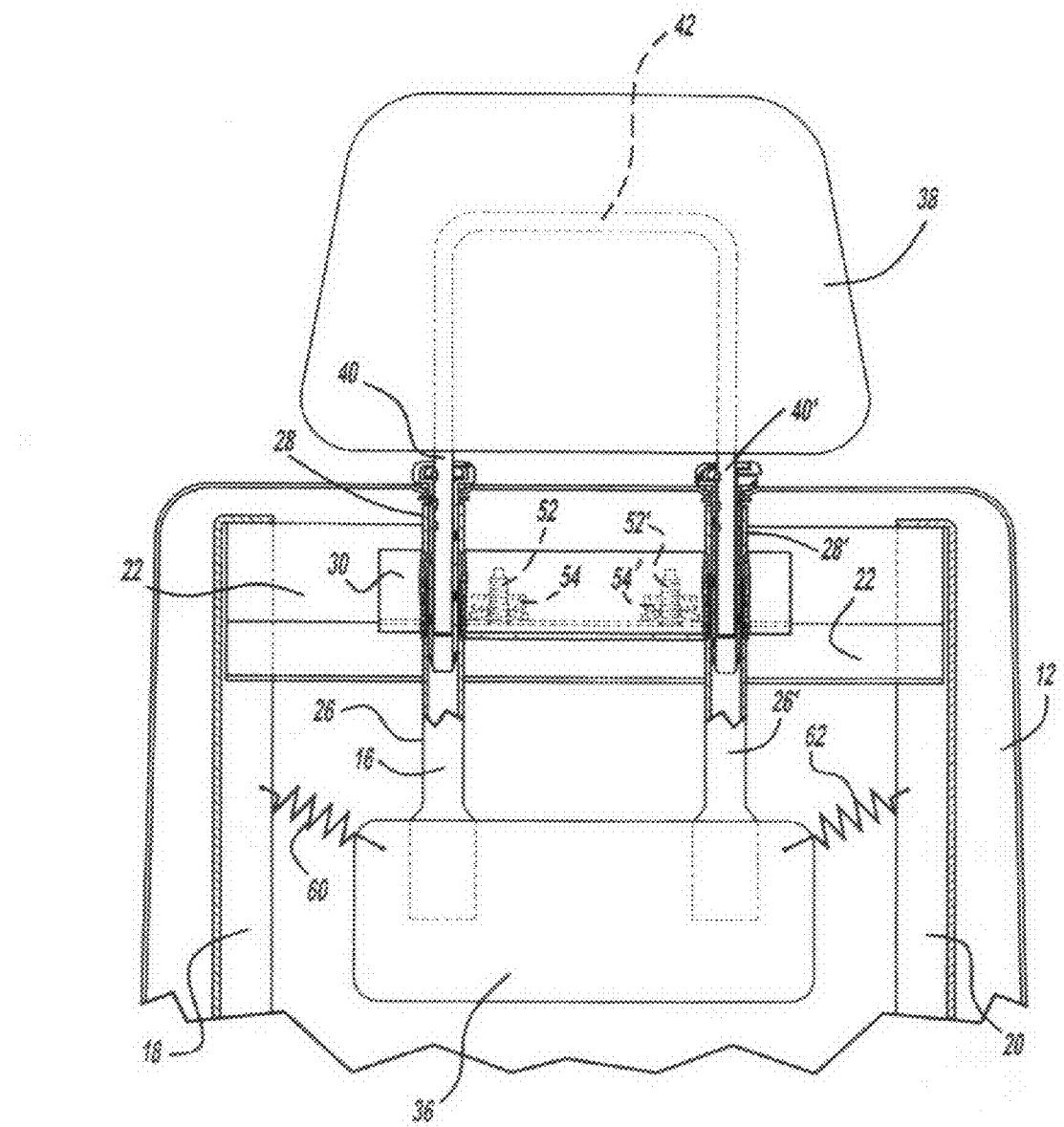
FIG. 3 is a front view of the first embodiment reactive head restraint mechanism and a portion of the seat back frame.
Figure 4:
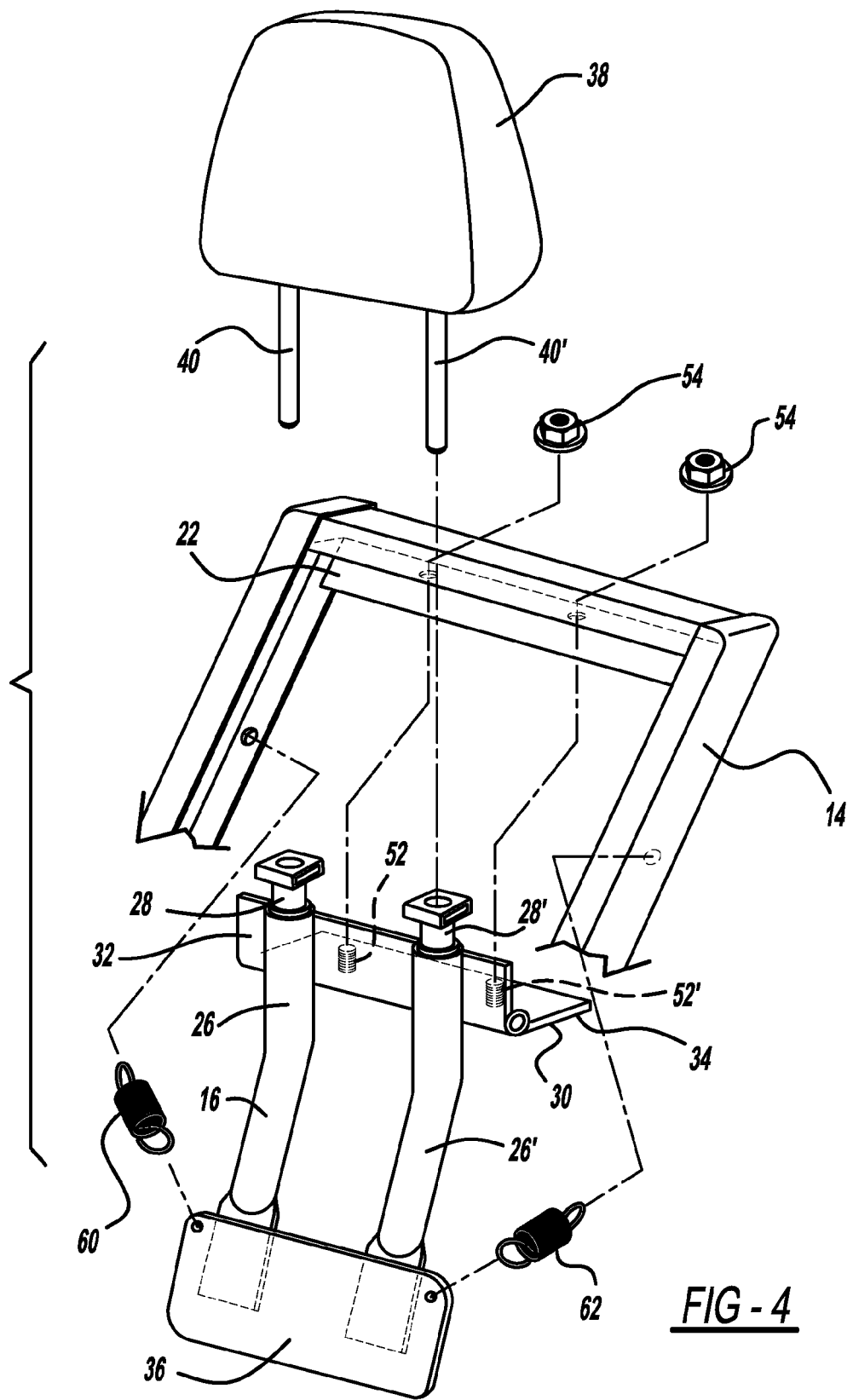
FIG. 4 is a perspective view of the first embodiment of the reactive head restraint system of the disclosed invention.

In the following figures, the same reference numerals will be used to refer to the same components. In the following description, various operating parameters and components are described for different constructed embodiments. These specific parameters and components are included as examples and are not meant to be limiting.

In general, FIGS. 1 through 5 relate to a first embodiment of the reactive head restraint system of the disclosed invention. FIGS. 6 and 7 relate to a second embodiment of the reactive head restraint system of the disclosed invention.

The figures illustrate various portions of a seat back, generally illustrated as 12. The seat back 12 includes a seat back frame 14 and a reactive head restraint mechanism 16. The seat back frame 14 includes a left side support member 18, a right side support member 20, and an upper cross member 22. The shape and construction of the seat back frame 14 is conventional and may include either welded stampings or tubular components. The upper cross member 22 may be S-shaped as illustrated or may be of a variety of other shapes. The adaptability of the reactive head restraint mechanism 16 to a conventional seat back frame 14 is one of the many advantages of the disclosed invention. This feature enables the use of existing seat back frame designs so as to avoid the additional expense of a modified seat back frame. The side members 18 and 20 are preferably welded to the upper cross member 22 to form the seat back frame 14. Alternatively, the members 18 and 20 may be mechanically fastened, e.g., bolted, bonded or otherwise connected to form the seat back frame 14.

The seat back frame 14 provides support for a back seat cushion 24. The seat back frame 14 is movably attached to a seat lower structure (not shown). For example, the seat back frame 14 is adjustable relative to the seat bottom.

The exemplary reactive head restraint mechanism 16 includes a pair of spaced apart steel tubes 26 and 26', a pair of plastic guide sleeves 28 and 28' with the plastic guide sleeve 28 being inserted into the top end of the steel tube 26 and the plastic guide sleeve 28' being inserted into the top end of the steel tube 26', an attachment hinge 30 having a front leaf 32 attached to the steel tube 26 by weld 33 and a rear leaf 34, and a push plate 36 attached to the lower end of the steel tubes 26 and 26'. A cushioning bumper 37 is provided both to prevent squeaks and rattles and to limit movement of the front leaf 32 of the hinge 30 toward the cross member 22.

The steel tubes 26 and 26' are attached to the front leaf 32 of the attachment hinge 30, for example, by welding, although other methods of attachment are possible, including mechanical fastening by nut and bolt fasteners. The push plate 36 is attached to the steel tubes 26 and 26' also by welding or with fastners or snap-in mechanical means as well. The push plate 36 may be composed of a molded plastic or metal.

A head restraint 38 having a pair of posts 40 and 40' extending from an internal tube 42 is attached to the head restraint mechanism 16 with guide sleeves 28 and 28'. The post 40 is slidably inserted into the plastic guide sleeve 28 and the post 40' is slidably inserted into the plastic guide sleeve 28'. The head restraint 38 is thus adjustable in height relative to the seat back 12 and may be locked into place at a selected height according to known means. Alternatively, the height of the head restraint 38 may be non-adjustable.

The upper cross member 22 has a forward portion 46 and a lower portion 48. While the front leaf 32 is attached to the pair of steel tubes 26 and 26' the rear leaf 34 is attached to the upper cross member 22. Particularly, the rear leaf 34 of the hinge 30 is attached to bottom side of the lower portion 48 of the upper cross member 22. Attachment of the rear leaf 34 to the lower portion 48 may be made by any one of several attachment methods, but a preferred method is the illustrated mechanical fastening method which includes two weld studs 52 and 52' which are fastened respectively by hex nuts 54 and 54'. Another possible method of attachment is welding.

A preferred method of attaching the hinge 30 to the upper cross member 20 according to the first embodiment of the disclosed invention is illustrated in FIGS. 1 through 5. As an alternative, the hinge 30 may be attached to the upper cross member 22 as illustrated in FIGS. 6 and 7 according to the second embodiment of the disclosed invention. In these figures the rear leaf 34 of the hinge 30 is attached to the forward portion 46 of the upper cross member 22. Attachment is made by two weld studs 56 and 56' fastened by hex nuts 58 and 58'. The method of attachment shown in FIGS. 6 and 7 in which the weld studs are provided horizontally may simplify attachment by providing the installer with easy access for assembly. As shown, an attachment tool such as a power gun PG (shown in broken lines) having a conventional socket may be used during the assembly process. In other ways the embodiment shown in FIGS. 6 and 7 is arranged in the same manner as shown in FIGS. 1 through 5. A cushioning bumper 59 is attached to the front leaf 32. Similar in function to the cushioning bumper 37 shown in FIGS. 1, 2 and 5, the bumper 59 both prevents squeaks and rattles and limits movement of the front leaf 32 of the hinge 30 toward the rear leaf 34.

Figure 5:
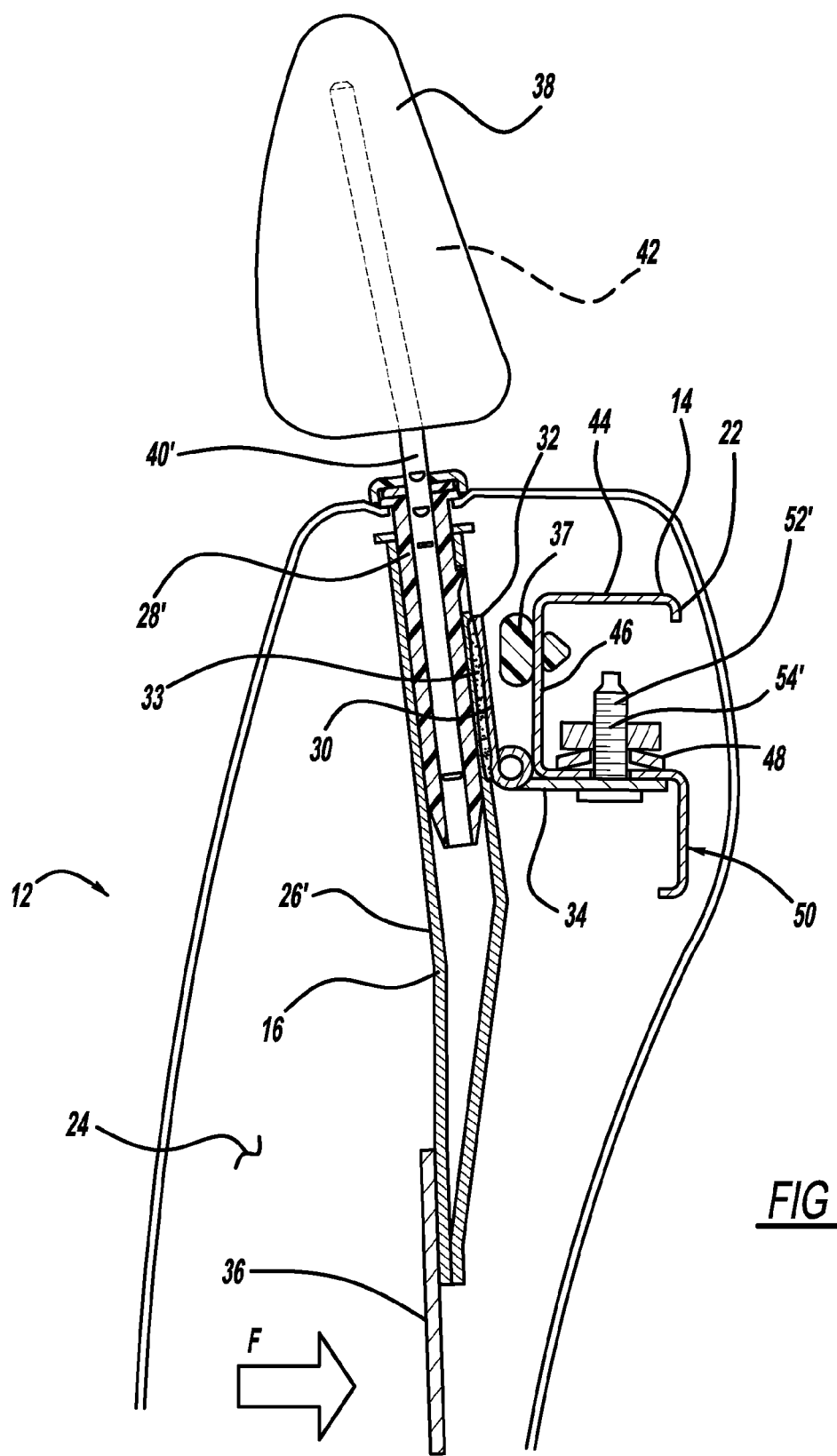
FIG. 5 is the same illustration as that of FIG. 1 except that the reactive head restraint mechanism according to the first embodiment of the disclosed invention is rotated to its forward position.
Figure 6:
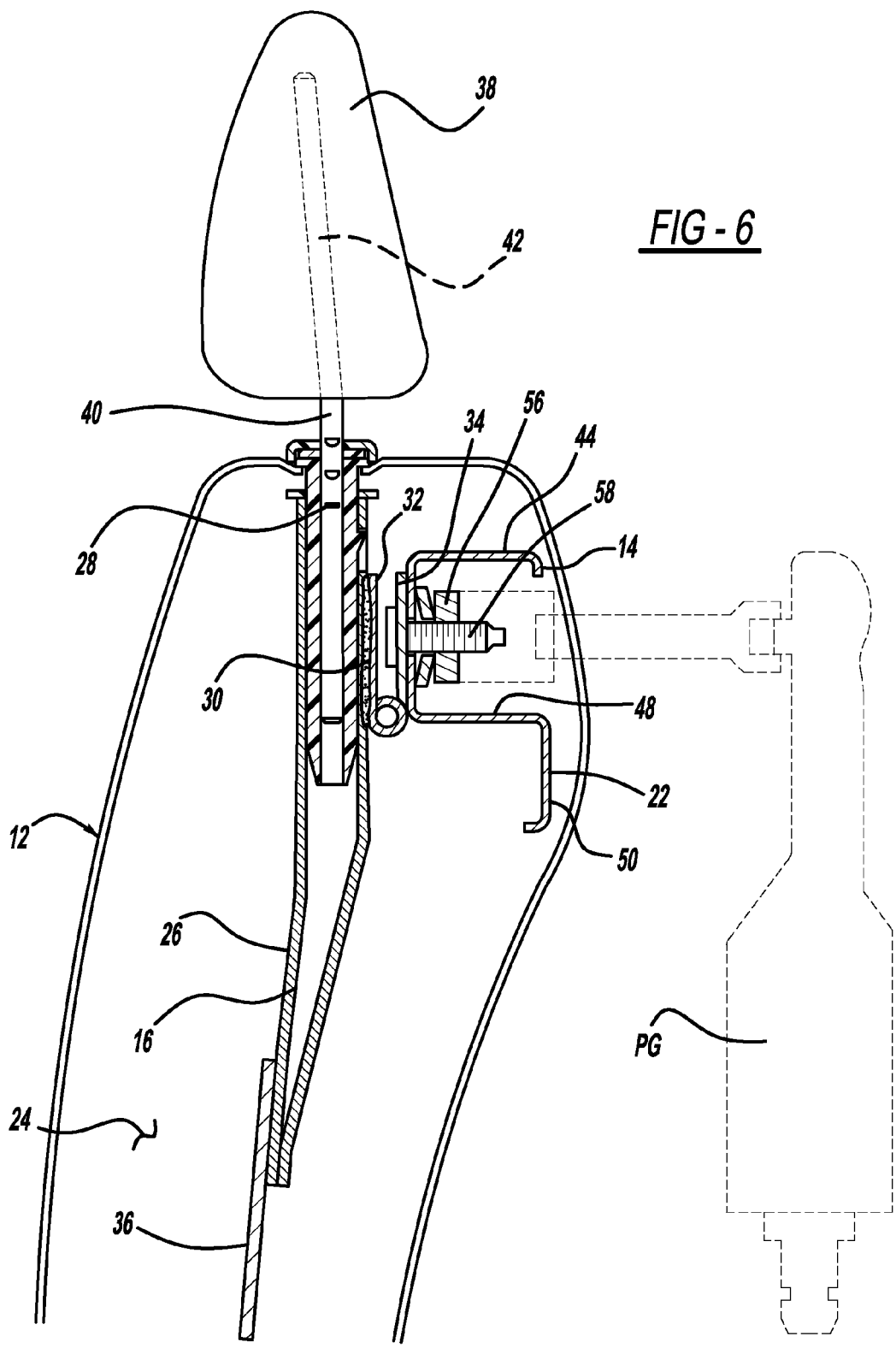
FIG. 6 is a side view with a cross-section of the second embodiment of the reactive head restraint system of the disclosed invention showing a diagrammatic air tool for assembly.
Figure 7:
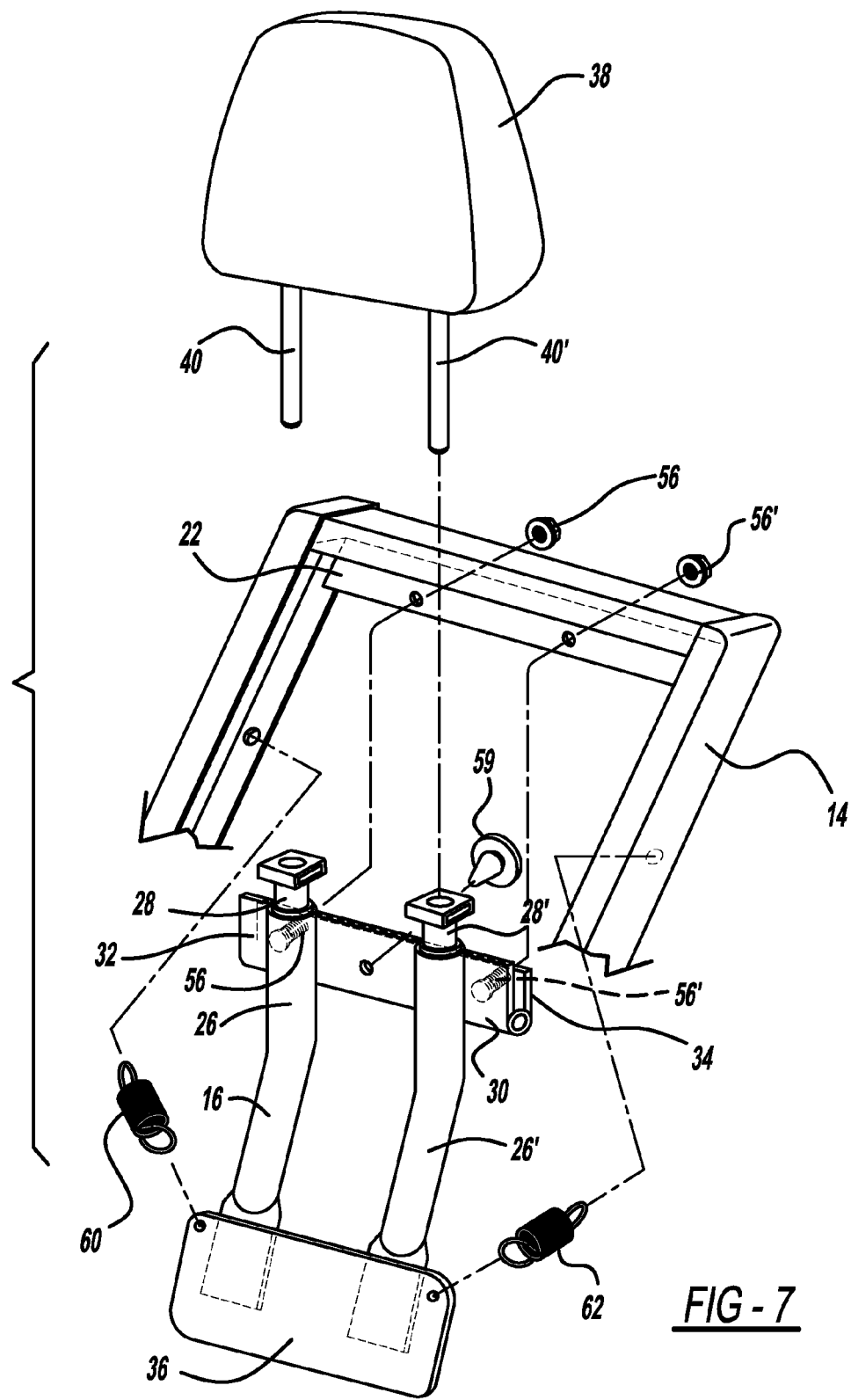
FIG. 7 is a perspective view of the second embodiment of the reactive head restraint system of the disclosed invention.

Regardless of the arrangement for connecting the reactive head restraint mechanism 16 to the upper cross member 22, the reactive head restraint mechanism 16 permits movement of the head restraint 38 between its normal rearward position shown in FIGS. 1 through 3 and 6 and its head supporting forward position shown in FIG. 5. To maintain the head restraint 38 in its normal position and to return the head restraint mechanism to its normal position after rear impact, biasing elements such as a left spring 60 fitted between the left side support member 18 and the push plate 36 and a right spring 62 fitted between the right side support member 20 and the push plate 36 are provided.

The normal rearward position shown in FIGS. 1 through 3 and 6 is maintained by the springs 62 and 64. However, during an impact event, the head restraint is moved to the head supporting forward position of FIG. 5. With reference to that figure, a force F directed toward the rear of the vehicle may be generated by the seat occupant (not shown) due to differences in velocity between the vehicle and the occupant. As a result, the occupant is pushed into the seat back 12. This force F moves the push plate 36 toward the rear of the vehicle. As shown in FIG. 5, the head restraint 38 is shown in its forward-most head supporting position, having been rotated forward. The reactive head restraint mechanism 16 rotates about the pin of the hinge 30. The head restraint 38 thus moves toward the front of the vehicle limiting the rearward movement of a head of the occupant.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A reactive head restraint system for a vehicle comprising:
   a seat frame having side support members and a cross member, said cross member having a forward-facing front transverse part, an upper part, and a lower part, said forward-facing transverse part, said upper part, and said lower part defining a rearward-facing opening;
   a reactive head restraint mechanism comprising a pair of tubes, a hinge having a first leaf directly attached to said tubes and a second leaf directly attached to said forward-facing front transverse part of said cross member by a nut and bolt fastener, said bolt fastener having a head, said first leaf of said hinge being opposed to and spaced apart from said second leaf of said hinge thereby defining a space for said head of said bolt fastener to be disposed therebetween, a push plate attached to said tubes, and a biasing element attaching one of said side support members to said plate; and a head restraint attached to said mechanism.

2. The reactive head restraint system of claim 1 wherein said biasing element is a spring.

3. The reactive head restraint system of claim 1 further including a bumper fitted to said first leaf of said hinge.

4. The reactive head restraint system of claim 1 further including a polymerized or metal head restraint post guide sleeve at least partially fitted within each of said tubes.

5. The reactive head restraint system of claim 1 wherein said bolt fastener is a weld stud.

* * * * *